United States Patent
Parisel et al.

(10) Patent No.: US 6,735,425 B1
(45) Date of Patent: May 11, 2004

(54) TELEPHONE WITH A DEMODULATOR CIRCUIT WITH AN IMPROVED LOCAL OSCILLATOR

(75) Inventors: Arnaud Parisel, Paris (FR); Xavier Dugast, Chatou (FR)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 09/567,759

(22) Filed: May 9, 2000

(30) Foreign Application Priority Data

May 10, 1999 (FR) .............................. 99 05925

(51) Int. Cl.⁷ .............................. H04B 1/06; H04B 7/00
(52) U.S. Cl. .................. 455/255; 455/258; 455/259; 455/264; 455/196.1
(58) Field of Search ................. 455/254–264, 455/161.1, 161.2, 161.3, 164.1, 164.2, 165.1, 182.1–182.3, 183.1–183.2, 192.1–192.3, 196.1–196.2, 62, 79; 331/16, 18, 114, 175, 179

(56) References Cited

U.S. PATENT DOCUMENTS

| | | | | |
|---|---|---|---|---|
| 4,583,059 A | * | 4/1986 | Konno | .......................... 331/158 |
| 4,837,852 A | * | 6/1989 | Takada et al. | ............... 455/197 |
| 5,557,643 A | | 9/1996 | Kim et al. | .................... 375/324 |
| 5,689,819 A | * | 11/1997 | Nishimura et al. | ............ 455/86 |
| 5,703,540 A | * | 12/1997 | Gazda et al. | .................. 331/16 |
| 6,026,278 A | * | 2/2000 | Suzuki | ....................... 455/38.3 |

FOREIGN PATENT DOCUMENTS

EP 0 483 090 A1 4/1992 .................. 331/158

\* cited by examiner

Primary Examiner—Lee Nguyen
Assistant Examiner—Tuan Tran
(74) Attorney, Agent, or Firm—Sughrue Mion, PLLC

(57) ABSTRACT

To address the problem of aging and drift of a local oscillator in a mobile telephone the frequency Fi of the local oscillator is shifted upwards so that base station logging-on FCH signals are measured perfectly whether said drift is upwards or downwards. It is shown that the actual drift resulting from the initial shift and drift with time can be measured during logging on. It is shown that conforming to the standard is facilitated without having to provide an oscillator whose frequency stability with time is guaranteed.

8 Claims, 1 Drawing Sheet

TELEPHONE WITH A DEMODULATOR CIRCUIT WITH AN IMPROVED LOCAL OSCILLATOR

The present invention relates to a demodulator with an improved local oscillator, for use mainly in the field of cellular telephony, in particular in the Global System for Mobile communications (GSM). In the field of cellular telephony, recognition protocols are instituted at the time a mobile telephone enters service in a network. These protocols impose technical constraints which are difficult for the equipment of the mobile telephone to satisfy. The object of the present invention is to provide an effective solution to a problem which occurs at the time of entry into service and which, in the prior art, can be solved only by choosing perfect local oscillators whose development cost is excessive.

BACKGROUND OF THE INVENTION

When a mobile telephone enters service in a cellular network, it enters into contact with a base station. Since the mobile telephone does not know in which cell of the network it is located, an entry into service routine includes seeking the most powerful beacon signal at the location of the mobile telephone. The beacon signal referred to is broadcast by the base station of a cell and includes various types of signal needed for new mobile telephones to log on in the cell and to maintain the surveillance of mobile telephones already present. The beacon signal is generally transmitted at a fixed beacon frequency Fi which can vary from one cell to another. In some cases some adjacent cells can share the same beacon frequency. In all cases, the signal transmitted at the beacon frequency is transmitted at a higher power than call signals exchanged between the base station of the cell and a mobile telephone, even the telephone in the cell at the greatest distance from the base station. Also, the beacon signal is broadcast continuously. Although it is divided into frames, and within those frames into time slots whose meaning changes from one slot to another, transmission is constant and at the same power level.

Without going into too much detail, the beacon signal is formed by a pattern repeated at the end of the aforementioned particular number of frames, for example 51 frames in the GSM. In this case the duration of a time slot is 577 microseconds and the duration of a frame is 4.615 milliseconds, because a frame includes eight time slots. The duration of a pattern, which includes groups of ten or eleven frames, is of the order of 235 milliseconds.

A first group of frames of the pattern is different from the next group. It includes FCH, SCH, BCCH and CCCH signals in each of its ten frames. The FCH (frequency control channel) signals correspond to the transmission of a carrier Fi (the control carrier) modulated by a pure sinewave offset by 67.7 kHz from the center of the channel. With this modulation frequency, in GSM coding with a modulation constellation with twelve points, code values I and Q with successive values (1,0), (0,1), (−1,0) and (0,−1) are transmitted and repeated. The modulated carrier is transmitted throughout a time slot.

A mobile telephone which has just entered service can therefore first determine which carrier it receives at the highest power. In a standard 35 MHz band allocated under the GSM 900 MHz standard (other bands are allocated under the DCS, PCS, and even UMTS standards), the mobile telephone determines which carrier at a beacon frequency it is receiving the best. It does this by scanning the band and applying a simple detection process, for example directly at the output of a receiver circuit, and even prior to demodulation. This scanning includes monitoring channels of standard width, which is 200 kHz in the GSM. Although the carrier frequencies dedicated to transmitting call signals are subject to frequency hopping from one time slot to another, the beacon frequency Fi is constant. It is therefore sufficient for a mobile telephone to monitor all the bands in succession to determine which one it is receiving the best.

When a beacon frequency Fi has been identified, the mobile telephone determines in which time slot it receives an FCH signal modulating the carrier Fi with a pure sinewave at 67.7 kHz. The problems addressed by the invention arise more particularly in this process. This is because, given the imposed channel width of 200 kHz, the demodulators in the demodulator circuits normally have a channel filter at their output. The bandwidth of a low-frequency channel filter runs from −100 kHz to 100 kHz. Demodulation transposes the modulated signal by mixing the received signal with a signal produced by a local oscillator at the carrier frequency Fi. However, demodulation is not perfect, because of imperfections of the local oscillator. If the local oscillator produces a signal at a frequency Fi+ϵ instead of producing a signal at a frequency Fi, the demodulated output signal will have a frequency equal to 67.7 kHz+ϵ.

Of course, if ϵ is small there is no problem. In particular, when a mobile telephone is new, i.e. during its manufacture, the local oscillator can be set so that ϵ has a value that is small or zero. In practice, referred to the beacon frequency Fi, the acceptable offset ϵ must be less than 23.5 parts per million (ppm) in the 900 MHz GSM band, less than 12.1 ppm in the 1800 MHz DCS band and less than 11.4 ppm in the 2100 MHz PCS band. This avoids demodulation problems due to the channel filter. Also, correction circuits are provided in a mobile telephone to measure the offset ϵ and to modify the values of the demodulated signals accordingly (and not to modify the demodulation frequency Fi+ϵ). In the demodulation systems used it is not really possible to modify the center demodulation frequency produced by the local oscillator, for example by means of a control loop. Why the architecture of these local oscillators rules out such adjustment of the demodulation frequency is explained below. In contrast, if the offset ϵ is small, and in particular if it is within the limits indicated above, it is possible to correct the demodulated signals so that on decoding they produce a value which allows for the measured offset ϵ. The offset ϵ is measured at the time of reception of the FCH signals.

Unfortunately the local oscillator frequency can drift due to aging of the equipment, and in some cases because of the conditions of use of the mobile telephone, such as temperature and voltage. The drift can be sufficient for the channel filter to interfere with the reception and demodulation of the signal at the frequency of 67.7 kHz. This is because there is a distinct slope, rather than a sharp cut-off, at the edge of the band of the channel filter, at around 100 kHz. In practice, received signals begin to be attenuated well short of a limit frequency of 100 kHz. Note that, for reception of call signals, this progressive cut-off (which has the advantage of simpler implementation of the channel filter and a lower penalty in terms of phase rotation) is not a problem because the quantity of information transmitted per hertz at the edge of the band is small. Most of the information is contained in the demodulated low frequencies.

OBJECTS AND SUMMARY OF THE INVENTION

In accordance with the invention, to remedy these drawbacks without having to adjust the filter, the local oscillator frequency is shifted upwards so that under optimum adjustment conditions, and in particular when it is brand new, i.e. immediately after manufacture, it produces a signal at a beacon frequency slightly higher than the expected standard frequency Fi. This being the case, in the demodulation process, a signal at a frequency Fi+ε' is subtracted from a received modulated carrier signal instead of a signal at a frequency Fi. Accordingly, and especially in the case of reception of the FCH signals, the demodulated signal will no longer be a signal at a frequency of 67.7 kHz but a signal at a frequency of 67.7 kHz–ε'. Consequently, if the local oscillator drifts because of aging, there is a margin for drift equal to ε' even before reaching the beginning of the tolerance range imposed by the channel filter. Consequently, even after several years' use, detection of the FCH signals is improved and the telephone logs onto a base station more efficiently.

In practice, the absolute value of the shift ε' is low. Its contribution can easily be compensated by the correction circuits already included in the receiver circuits and which neutralize the prior art shift ε. The shift ε' of the local oscillator is obviously upward so that the demodulated signal FCH is pulled towards low frequencies, to become a signal at less than 67.7 kHz, rather than towards high frequencies where, on its frequency becoming much greater than 67.7 kHz, it could reach the cut-off band of the channel filter, where its attenuation would purely and simply prevent it from being detected correctly.

The invention therefore provides a mobile telephone including a demodulator circuit including a local oscillator and a mixer with a local oscillator input and a demodulation input, the demodulation input receiving a signal modulating a carrier at a frequency Fi, wherein the output of the local oscillator is off-tuned upwards relative to the frequency Figure.

BRIEF DESCRIPTION OF THE DRAWINGS

The invention will be understood better after reading the following description and referring to the accompanying drawings. The drawings are provided exclusively by way of illustrative and non-limiting example of the invention. In the drawings.

MORE DETAILED DESCRIPTION

Figure 1A:
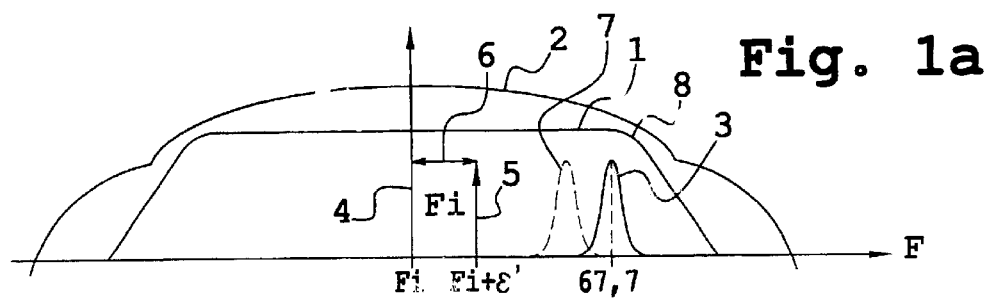
FIGS. 1a and 1b are spectral and temporal representations of an FCH signal to be detected with a demodulator circuit improved in accordance with the invention.

FIG. 1a includes a spectrum diagram 1 of a channel filter that can be used in a demodulator circuit of the invention or in a prior art demodulator circuit. It also includes a spectrum diagram 2 of a signal modulating a carrier which is to be demodulated by a demodulator circuit of the above kind. It further includes a spectral diagram 3 of a received carrier at a frequency Fi modulated by a pure sinewave signal (or an almost pure signal, as all the transmission distortion is still present). In the context of the problem addressed by the invention, the signal modulating the carrier Fi is a signal at a fixed frequency, which is 67.7 kHz under the GSM, DCS and PCS standards. The FIG. 1a diagram shows the center frequency 4 of the channel filter and of the spectrum of the signal 2 graphically (before transposition-demodulation). The value of the center frequency 4 is Fi. In practice, after demodulation, the center frequency is normally a zero frequency. Alongside the center frequency 4 is shown a demodulation frequency 5 which has been shifted upwardly in accordance with the invention. The value of the demodulation frequency 5 is Fi+ε'. A demodulated signal at 67.7 kHz is produced because demodulation amounts to subtracting a signal whose frequency is Fi from a signal whose frequency is Fi+67.7 kHz. However, the invention produces a signal at 67.7 kHz–ε. The offset 6, the value of which is ε', then amounts to a shift of the spectrum of the signal 3 in the filter 1 towards the center frequency of the filter. As is clear from FIG. 1a, the effect of this shift is to pass through the channel filter 1 a signal whose spectrum 7 is better centered in the channel filter.

The cut-off band 8 of the channel filter does not move with aging because the filter does not include any active components. However, the local oscillator frequency can drift with time because of aging. If the drift is downwards, Fi become Fi–ε, and without the invention the spectrum 3 would shift towards higher frequencies, i.e. towards 67.7 kHz+ε. This would entail the risk of entering the cut-off band 8. In this case, the signal FCH would not be detected correctly, or at all, preventing the mobile station from logging onto a base station.

Figure 1B:
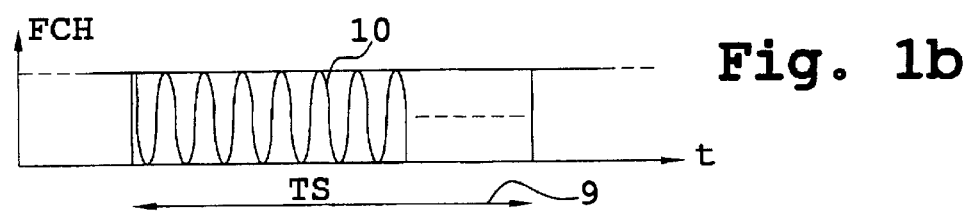

FIG. 1b is a timing diagram of a signal whose spectrum 3 is shown in FIG 1a. The FCH signal 10 modulating the carrier during a time slot TS 9 is a signal at 67.7 kHz in this example.

Figure 2:
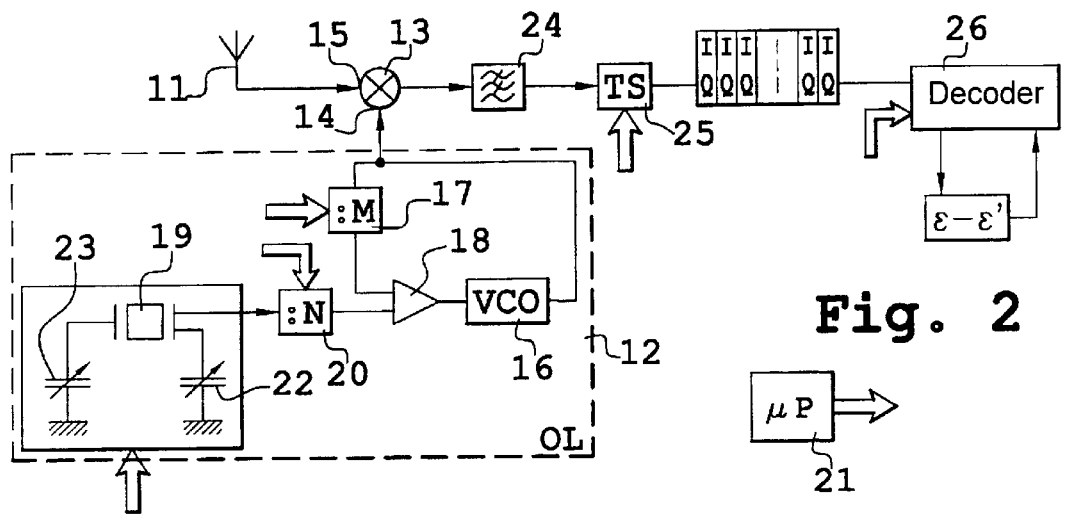
FIG. 2 is a diagrammatic representation of a circuit for demodulating and correcting FCH signals in accordance with the invention.

FIG. 2 shows a demodulator circuit of the invention. It includes a local oscillator 12 and a mixer 13. The mixer 13 has two inputs. The signal from the local oscillator 12 is fed to a first input 14. A signal from an antenna 11 of the mobile telephone is fed to another (demodulation) input 15. This signal, typically the signal from FIG. 1b, is a 67.7 kHz signal modulating a carrier at a frequency Fi. In the invention, the output of the local oscillator 12 is off-tuned upwards relative to the frequency Fi.

The local oscillator 12 is generally a voltage-controlled oscillator (VCO) 16 whose output is connected to the input 14. The output of the oscillator 16 is also connected to the input of a divider 17 which divides the frequency of the signal from the oscillator 16 by a value M. The output of the divider 17 is connected to a first input of a two-input comparator 18. A second input of the comparator 18 receives a signal produced by a stable oscillator 19. In practice the stable oscillator 19 is a quartz crystal oscillator. For practical reasons, the quartz crystal oscillator 19 produces a signal whose frequency is divided by a value N in a divider 20. In one particular example, the oscillation frequency of the quartz crystal oscillator 19 is of the order of 13 MHz. In this case the value of N is 65 and the frequency of the signal fed to the second input of the comparator 18 is 200 kHz. Broadly speaking, the divider 17 divides by 4500 so that the frequency of the signal at the input 14 is of the order of 900 MHz. Also, 900 MHz divided by 4500 is equal to 200 kHz. Consequently, for frequency hopping in steps of 200 kHz, it is sufficient to impose on the divider 17 values of M varying by one unit. The circuit diagram of the oscillator 12 can in practice be different. In theory it is that shown, the divider 17 and the divider 20 receiving the division signals M and N from a microprocessor 21 controlling the mobile telephone.

In the prior art, the quartz crystal oscillator 19 is factory set once and for all, in particular by means of trimmer capacitors 22. In theory, the frequency of the signal from the oscillator 19 is highly stable and should not vary in time. It is therefore adjusted so that the frequency of the signal at the output of the divider 20 is exactly 200 kHz.

In the invention, the output of the oscillator 12 is shifted upwards to produce a signal at a frequency Fi+ε' and, in the architecture shown here, the output of the quartz crystal oscillator 19 is shifted upwards to achieve this. Because of the multiplication by M/N, the frequency of the output signal of the oscillator 12 is proportional to the output frequency of the quartz crystal oscillator 19.

Since frequency hopping by the mobile telephone in steps of 200 kHz can be achieved by means of the divider 17, it is not possible to shift by a small amount each of the frequencies Fi produced by the oscillator 12 when it begins to drift with age.

In one example the upward shift relative to the frequency Fi is less than 10 kHz. In practice the shift is 5 kHz. In this case, under the GSM 900 MHz standard, the shift is respectively $5 \times 10^3 / 900 \times 10^6$ or $10^4 / 900 \times 10^6$, i.e. 5 ppm or 10 ppm. However, a distinction needs to be drawn depending on the required mode of use. Because of the multiplications caused by the dividers 17 and 20, a shift of 5 kHz in the GSM (where M has a value of the order of 4500) is equivalent to a shift of 10 kHz in the DCS or PCS (where M has a value of the order 9000 or 10500).

Under these conditions, the trimmer capacitors 22 or 23 can be switched according to a required mode of use. Alternatively, knowing that a shift of 10 kHz can be tolerated, an upwards shift by 5 kHz can be chosen for the GSM 900 MHz standard. This upwards shift induces a shift of 10 kHz under the DCS or PCS standard. In this case, the common shift is preferably valid from 800 MHz to 2200 MHz. In the former case, a switching circuit also controlled by the microprocessor 21 can switch between the trimmer capacitors 22 and 23.

The demodulator circuit further includes a low-pass channel filter 24 whose spectrum 1 is shown in FIG. 1a. The output signal from the filter 24 is fed to a signal sampling circuit 25 controlled by the microprocessor 21. The sampling circuit 25 produces samples I and Q in a manner that is known in the art. There are 141 usable samples in each time slot. There can be 156.25 samples in the practical case of a 577 microsecond time slot, but the first and last samples in the slot are meaningless and the meaning of the call is therefore not degraded if they are not received. The samples form a series of signals I and Q relating to quadrature demodulation by the demodulator 13.

The sampling circuit 25 produces samples I and Q which are transmitted to a decoder 26. The decoder 26 is adapted to extract information ε relating to the drift of the oscillator 12 when the FCH signals are received, in a manner that is known in the art. The information ε is also used by the decoder 26 to correct the values of the received samples I and Q, rather than the frequency of the oscillator 12 (as already indicated, this is not possible). This form of digital correction is known in the art. The particular feature of the invention is that the drift error ε is in part compensated by a pre-adjustment ε'. In other words, the decoder 26 now produces by way of correction an error signal equal to ε–ε'. Initially, when the mobile telephone is new, ε is zero and the decoder 26 produces the expected error ε', which is used to apply the corrections.

The immediate result obtained with the invention is that the signals demodulated in the demodulator 13 are obtained at the output of the filter 24, whereas if the drift of the oscillator 12 had been tolerated without pre-correction there would be situations in which the filter 24 would attenuate the signals FCH too strongly, to the point that they would not be detected, even in the sampling circuit 25.

Figure 3:
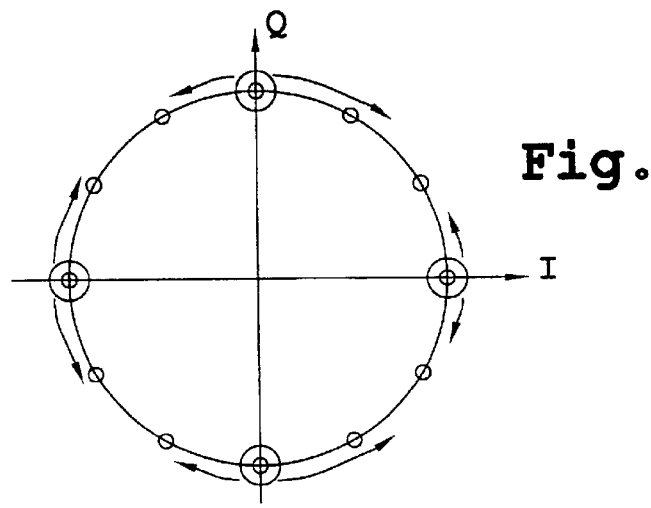
FIG. 3 is a representation of the symbols constituting an FCH signal to the GSM standard.

In a GSM-DCS-PCS context, FIG. 3 shows modulation coding corresponding to a signal at 67.7 kHz. In the constellation with 12 positions adopted, this signal has four preferred positions at which the signals I and Q have the respective values 1 and 0, 0 and 1, –1 and 0, and 0 and –1. In practice, the FCH signal is synthesized by a phase accumulator receiving this type of digital signal. At the receiver, the signals I and Q expected after decoding must have the values indicated above. If there is any drift the signals I and Q, which are themselves quantized on several bits, exhibit an angular shift relative to these values during a first measurement. As the signal is received, the shift is amplified, as shown by the lengthening of the arrows shown at the various points of the constellation. For a given amount of drift, only one direction of the arrows is relevant, of course. Referring them all to the point (1,0), it is found if there is an excessive drift the spread of the values prevents accumulation. On the contrary, the signals tend to neutralize each other. In practice, the measurement of ε results from this deterioration in the accumulation of the referred signals. The invention applies the correction as in the prior art: it is possible to determine the value ε–ε' resulting from long-term drift.

One improvement is to modify the algorithm for correcting the values of the signals I and Q. In the prior art, the drift can shift the local oscillator frequency upwards or downwards. In the invention, it is known that the shift is necessarily upwards, at least initially. It is therefore possible to modify the correction algorithm to allow for this a priori knowledge so that it converges faster. In the final analysis, it is known that an attempt must initially be made with a value of ε which is also known in advance, factory set and equal to ε', rather than by trial and error with any value of ε and retaining only the value of ε which maximizes accumulation. Since local oscillator drift is slow, it is possible to store the value ε–ε' obtained from one day to another or from one month to another in order to deduce the corrections to be applied to the measured signals I and Q (during a call) to apply the global correction.

What is claimed is:

1. A mobile telephone having a demodulator circuit including a local oscillator and a mixer with a local oscillator input and a demodulation input, the demodulation input receiving a signal modulating a carrier at a frequency Fi, said signal having a fixed frequency and being adapted to be demodulated by said demodulator circuit, said demodulation circuit comprising a low-pass channel filter having an upper cut-off frequency, wherein the local oscillator has an output whose frequency is off-tuned by a shift upwards relative to the frequency Fi, the frequency shift of said output being determined so that the demodulated said signal is pulled towards a low frequency in order to avoid reaching said upper cut-off frequency of said low-pass channel filter.

2. A telephone according to claim 1, comprising a circuit for measuring the modulating signal at the fixed frequency, and a circuit for correcting the frequency of the oscillator so that the measured frequency of the modulating signal at the fixed frequency is equal to an expected frequency.

3. The telephone according to claim 2, wherein the correcting circuit includes an algorithmic circuit which anticipates the correction to be applied as a function of the upwards off-tuning, which is known in advance.

4. The telephone according to claim 1, wherein the oscillator comprises a quartz crystal oscillator producing a basic signal, and a control loop effecting multiplication of the basic signal to a higher carrier frequency.

5. A telephone according to claim 4, wherein the output of the quartz crystal oscillator is off-tuned upwards by less than 10 kHz.

6. A telephone according to claim 5, wherein the output of the quartz crystal oscillator is off-tuned upwards by less than 5 kHz.

7. A telephone according to claim 4, wherein the output of the quartz crystal oscillator is shifted in a single direction, and wherein the modulated carrier signal is in a range from 800 MHz to 2200 MHz, and wherein the output of the quartz crystal oscillator is off-tuned upwards by less than 10 kHz.

8. The telephone according to claim 4, wherein the quartz crystal oscillator includes switchable trimmer capacitors for applying the shift.

* * * * *